PHASE-CONTROLLED SYNCHRONOUS DEMODULATOR

Filed July 18, 1961 2 Sheets-Sheet 1

INVENTOR.
Adrian J. De Vries
BY Francis W. Crotty
Atty.

PHASE-CONTROLLED SYNCHRONOUS DEMODULATOR

Filed July 18, 1961

INVENTOR.
Adrian J. De Vries
BY
Francis W. Crotty
Atty.

United States Patent Office 3,209,270
Patented Sept. 28, 1965

3,209,270
PHASE-CONTROLLED SYNCHRONOUS DEMODULATOR

Adrian J. De Vries, Elmhurst, Ill., assignor to Zenith Radio Corporation, a corporation of Delaware
Filed July 18, 1961, Ser. No. 124,855
12 Claims. (Cl. 329—50)

Figures 1, 2:
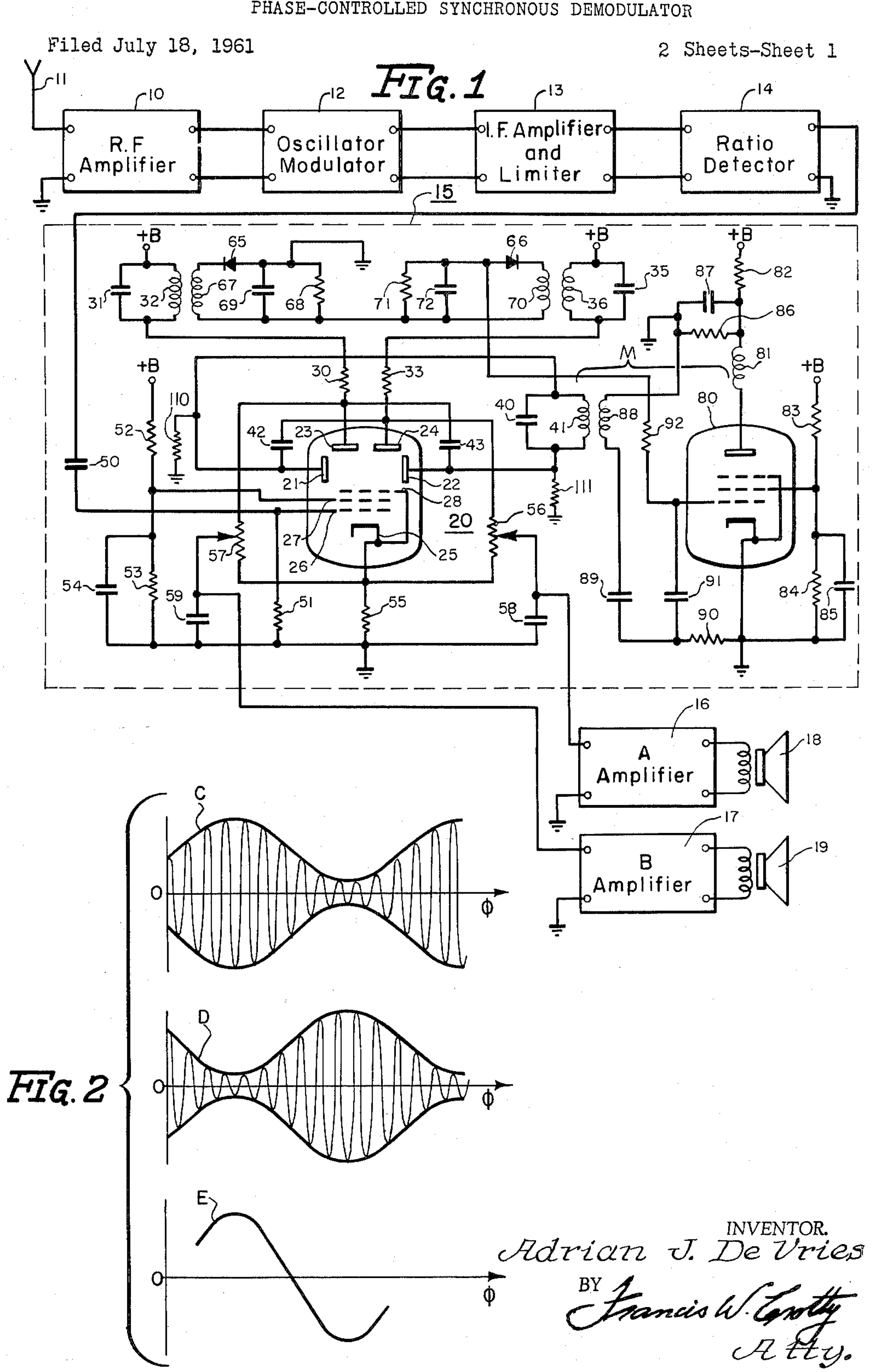

The present invention is particularly addressed to the phase control of a synchronous demodulator and, while being of general application, is of special merit for a receiver utilized in the reception of stereophonic frequency modulation broadcasts transmitted in accordance with the standards recently accepted by the Federal Communiations Commission. For convenience, the disclosure will be presented in that environment.

The frequency modulation stereophonic broadcast system, specified by the standards of the Federal Communications Commission, makes use of the sum and difference principle in order to obtain compatibility to the end that a stereophonic broadcast may be enjoyed by individuals who possess monophonic frequency modulation receivers of conventional structure. The signal is radiated as a carrier wave, having complex modulation in accordance with the following modulation function:

$$M(t)=K_1(A+B)+K_2(A-B)S+K_3S' \qquad (1)$$

The first term of expression (1) is the sum of the right and left signals characteristically associated with a stereophonic program. The next term denotes the fundamental modulation components of a suppressed-carrier amplitude-modulated subcarrier which conveys the difference information of the right and left channels while the final term is a pilot signal to facilitate synchronization of receivers to the transmitter. The pilot is controlled to have a fixed phase with respect to the carrier of the suppressed-carrier-modulated signal and may correspond in frequency to the fundamental of the subcarrier although the standards, as adopted, prescribe the use of a pilot at half the fundamental frequency.

A frequency modulation stereophonic system featuring a signal as described above is the subject of an application of Robert Adler et al., Serial No. 22,926 filed April 18, 1960 and assigned to the same assignee as the present invention. The Adler et al. application particularizes as to the derivation of the system and its attractive attributes including compatibility, high fidelity, tracking, accommodation of auxiliary services, and so forth. A refined form of transmitter for such a system is described and claimed in an application of Carl G. Eilers, Serial No. 23,030 filed April 18, 1960 and a companion receiver, employing a beam-deflection tube as a synchronous demodulator, is the subject of applicant's copending application Serial No. 22,830 filed April 18, 1960, now Patent No. 3,133,993, issued May 19, 1964; the last two mentioned applications are likewise assigned to the same assignee as the present invention.

As described in each of the aforementioned applications, it is highly desirable that the receiver for use in such a stereophonic system be of high quality. It should have enhanced sensitivity for good fringe area performance and should have a wider intermediate-frequency pass-band than exhibited by conventional monaural frequency modulation receivers to prevent cross talk and preserve the attractive signal-to-noise ratio attainable through frequency modulation. For the same reasons it is desirable to include automatic gain control of at least the intermediate-frequency stages of the receiver and automatic frequency or phase control of the local oscillators.

Since the subcarrier conveying the difference information is suppressed-carrier modulated, it is necessary to supply a carrier component at the receiver and this is usually accomplished by a signal generator for developing a demodulation signal having the same frequency as the fundamental of the suppressed-carrier wave. For satisfactory performance it is desirable to control the phase of the demodulation signal so that it maintains a constant phase relation to the pilot signal received as a component of the stereophonic broadcast. The De Vries application identified above shows the use of an APC loop, as it is called in the art, for controlling the phase of the local subcarrier oscillator. While this accomplishes the desired objective satisfactorily, an improvement may be obtained with the present invention in that a properly phased demodulation signal may be developed through a simplified receiver structure.

Accordingly it is a principal object of the invention to provide a new and improved synchronous demodulator which is particularly useful in the receiver portion of the described frequency modulation stereophonic system.

A specific object of the invention is to provide a novel arrangement of a synchronous demodulator and a local oscillator for supplying a demodulation signal of proper phase to the demodulator.

Another object of the invention is the provision of a novel multi-mode arrangement having one operating mode in which it functions as a synchronous detector and a second mode in which it functions essentially as a wave signal amplifier.

Another specific object of the invention is an improved receiver arrangement for a stereophonic frequency modulation system of the type described which automatically adjusts itself in accordance with the character of the received program signal as between a monophonic mode of signal reproduction on the one hand and a stereophonic mode of reproduction on the other.

A synchronous demodulator embodying the invention lends itself most advantageously to the detection of a suppressed-carrier amplitude-modulated carrier wave accompanied by a pilot signal of fixed phase and of $1/N$ times the frequency of the fundamental of the carrier wave where N is an integer preferably less than three. The demodulator comprises means, including a pair of detectors having individual load networks, for demodulating the carrier wave. It further comprises means for developing and applying to the demodulating means a demodulation signal corresponding in frequency to the fundamental frequency of the carrier wave. Other means are utilized to concurrently apply the carrier wave and the pilot signal to the demodulating means to develop therein an alternating-current signal having amplitude variations representing the relative phase of the pilot and the demodulation signals. A phase detector derives from at least one of the detector load networks and rectifies the amplitude-modulated signal to develop a control potential representing the sense and extent of deviation of the phase relation of the demodulation signal and the pilot signal from a desired reference phase condition.

Finally, there are means for utilizing this control potential to effect phase changes of the demodulation signal to establish and maintain the reference phase condition.

In one structural embodiment, the synchronous demodulator makes use of a beam-deflection tube arranged to be self-oscillatory to develop a demodulation signal corresponding to the fundamental of the suppressed-carrier-modulated subcarrier wave. The modulation of this signal with the pilot component of the received complex modulated stereophonic signal produces a beat note having the same nominal frequency as the pilot since the pilot, according to specifications of the Federal Communications Commission, is half the fundamental of the subcarrier wave. The combination of this beat with the pilot signal produces a signal, also corresponding in frequency with the pilot, but amplitude modulated to reflect phase changes of the beat and pilot signals. Each of the load circuits connected to the two anodes of the deflection tube has a circuit tuned to the pilot and these two tuned circuits are included in a balanced phase detector system. The direct-current output potential from the phase detector controls a reactance tube and, through it, the phase of the locally generated demodulation signal to maintain the proper phase with the received pilot.

The self-oscillating feature of the synchronous demodulator permits simplification of the system even though it is clear that a separate local oscillator may be utilized to supply the demodulation signal to the synchronous detector.

Figure 3:
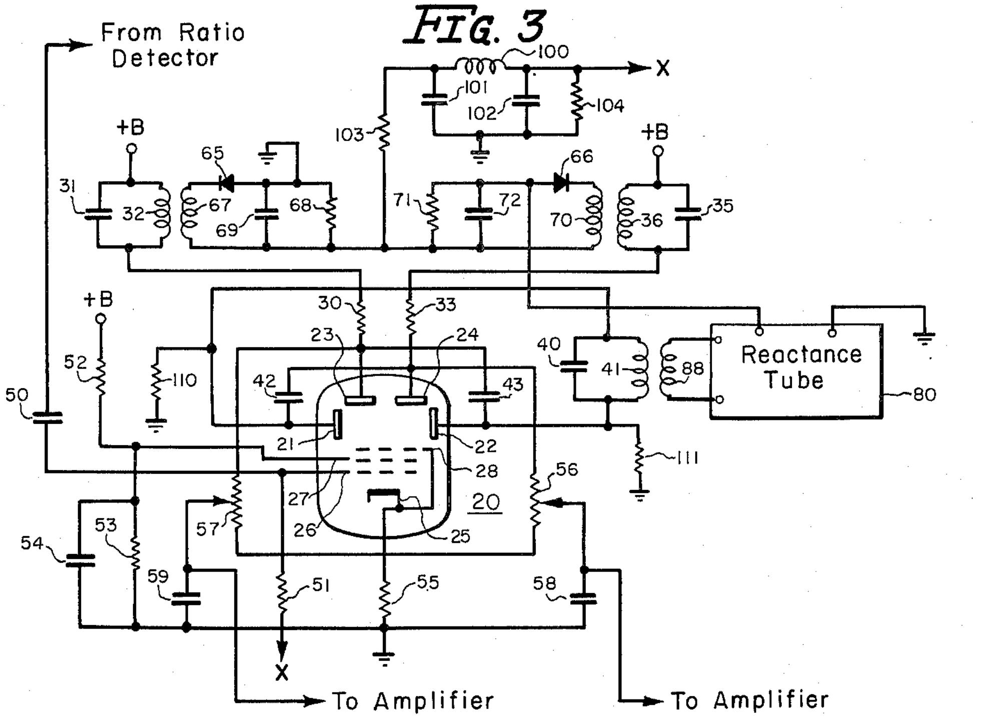
Figure 4:
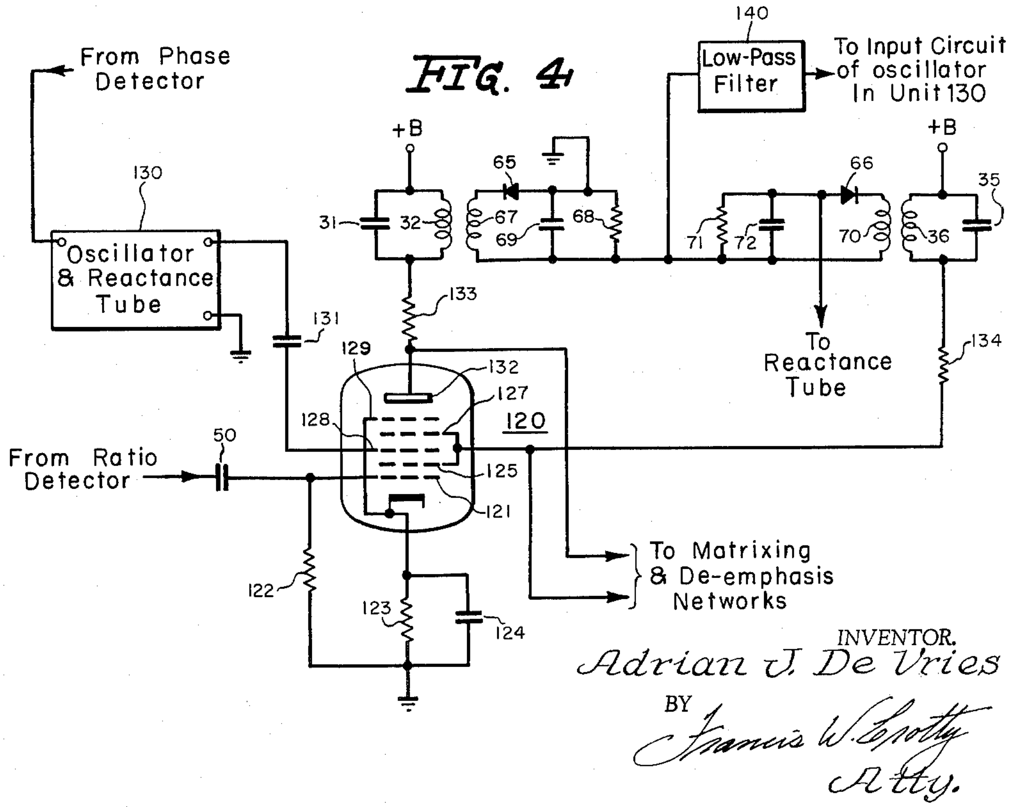

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIGURE 1 is a schematic representation of a stereophonic frequency modulation receiver embodying one form of the present invention;

FIGURE 2 comprises curves utilized in explaining certain operating features of the receiver of FIGURE 1; and FIGURES 3 and 4, inclusive, are further embodiments of the invention.

Referring now more particularly to FIGURE 1, the receiver there represented is a stereophonic instrument for utilizing a frequency-modulated carrier wave conveying stereophonic information. It will be assumed that the carrier wave is frequency modulated in accordance with the modulation function of expression (1) with the pilot signal frequency half the fundamental component of the suppressed-carrier-modulated wave conveying the difference information. Arrangements for generating and transmitting a program signal of this definition are described and claimed in each of the afore-identified Adler et al. and Eilers applications. Since the subject invention concerns the receiver as distinguished from the transmitter, the remainder of this description will center on the make-up and operation of the receiving instrument.

As shown in FIGURE 1, the receiver comprises a radio-frequency amplifier 10 of any desired number of stages having an input connected with an antenna 11. Coupled in cascade with amplifier 10 are an oscillator modulator 12, an intermediate-frequency amplifier and amplitude limiter 13, and a ratio detector 14. For the most part the construction of each of these stages is well understood in the art although certain deviations from the specifications of a conventional monophonic receiver are desired.

For example, unit 13 may include more than one limiter because optimum performance requires fairly complete limiting. It is also preferred that the receiver have a high sensitivity so that the signal-to-noise ratio will be acceptable in fringe areas. Both automatic gain control for the RF and IF stages and automatic frequency control for the heterodyne oscillator of unit 12 are desirable and may be considered to have been included in the block showing. The intermediate-frequency bandwidth of the usual monaural frequency modulation receiver is 150–180 kilocycles wide at the −6 decibel point but the bandwidth for the receiver under consideration should be wider to prevent intermodulation or cross talk of auxiliary services that may be simultaneously accommodated on the single radiation from the transmitter as described in the above-identified Adler et al. application. A bandwidth of 230 kilocycles is adequate if automatic gain control maintains the level of signal through the RF and IF amplifiers at substantially constant value in spite of variations in intensity of the received signal. It is also desirable to extend the bandwidth of detector 14 to be wider than 300 kilocycles.

Following ratio detector 14 is a synchronous demodulator and automatic phase control system enclosed within broken line rectangle 15 which will be considered in detail hereinafter. Suffice it to say at this juncture that unit 15, operating upon the composite modulation signal obtained at the output circuit of ratio detector 14, develops the A and B audio signals or right and left signals for application to an A audio amplifier 16 and to a B audio amplifier 17, respectively. Each of these amplifiers has any desired number of stages and they drive the A and B speakers 18, 19 which have a suitable space relation within the area that they serve to produce a stereophonic sound pattern.

Neglecting for the moment the details of unit 15, the described receiver is of the usual tunable superheterodyne type. It may be tuned to a selected station transmitting a stereophonic frequency modulation broadcast comprising a carrier wave modulated in accordance with expression (1). That signal, after selection and amplification in radio-frequency amplifier 10, is converted in oscillator modulator 12 to the intermediate frequency of the receiver and is delivered to unit 13. After additional amplification, the intermediate-frequency signal is amplitude-limited and supplied to ratio detector 14 which, operating in conventional fashion, derives an output signal representing the composite modulation of expression (1). This output signal is operated upon in unit 15 to derive separated A and B audio signals which, after further amplification in amplifiers 16 and 17, drive speakers 18 and 19, respectively, to accomplish stereophonic sound reproduction.

More particular consideration will now be given to the synchronous demodulator and automatic phase control arrangement 15. It is an arrangement especially useful for detecting a suppressed-carrier amplitude-modulated carrier wave accompanied by a pilot signal of fixed phase but $1/N$ times the frequency of the fundamental of that carrier wave, where N is an integer having a value of one or two. For the specific transmission comprehended by the standards of the Federal Communication Commission for stereophonic frequency modulation broadcasting, the pilot signal is half the frequency of the fundamental of the subcarrier wave conveying the $(A-B)$ or difference information. For this reason the components of network 15 are selected and will be described for the particular case where the pilot has this half frequency relation.

Since the demodulator is to derive separated A and B audio signals, it comprises means, effectively including a pair of detectors having individual load networks, for demodulating the suppressed-carrier-modulated wave. A number of different structures may be used including gated diodes, multi-grid tubes of the 6BN6 or 6BE6 type or beam deflection tubes, the latter being shown in the arrangement of FIGURE 1. The beam deflection tube 20 has the usual electrode system including a pair of deflector electrodes 21, 22 coupled to ground through resistors 110, 111 and a pair of anodes or output electrodes 23, 24. The remainder of the electrode system comprises a cathode 25 which is followed by a control electrode or grid 26, a screen grid 27 and a suppressor 28 which may be coupled to the cathode as shown. The tube is of conventional design to develop an electron beam which may be deflected in accordance with a deflection signal applied to deflectors 21, 22 to impinge in alternation upon anodes 23 and 24. Each of the anodes has its own individual load network represented, in the case of anode 23, as a resistor 30 connected to a source of operating potential +B through a resonant circuit comprising the parallel combination of capacitor 31 and an inductor 32. The load network for anode 24 comprises a resistor 33 coupled to potential source +B through a similar resonant circuit defined by a capacitor 35 and an inductor 36.

It is of course well understood that demodulation may be accomplished through the use of a beam-deflection tube by the application of a demodulation signal to deflectors 21, 22 and the concurrent application of the signal to be detected to control electrode 26. Where the signal applied to control electrode 26 corresponds to the modulation function of expression (1), it is necessary that the demodulation signal applied to the deflectors correspond accurately as to both frequency and phase with the fundamental component of the suppressed-carrier-modulated subcarrier wave and, while the required demodulation signal may be developed in a separate oscillator, simplification is attained by including the oscillation generator within the synchronous demodulator.

For this reason the deflection tube is arranged to serve concurrently as a demodulator and a modulation signal generator. To that end, a resonant circuit formed of a capacitor 40 in parallel with an inductor 41 is coupled across deflectors 21, 22. This circuit is tuned to the frequency of the fundamental of the subcarrier wave conveying the difference information. Additionally, each deflector is cross-coupled with the anodes of the beam deflection tube, a capacitor 42 coupling deflector 21 to anode 24 and a capacitor 43 coupling deflector 22 to anode 23. It may be shown that a negative resistance is exhibited across deflectors 21, 22 so that the necessary conditions for sustained oscillations are present if the operating potentials of the tube are selected to achieve adequate gain. Thus, tuned circuit 40, 41 coupled to the electrode system constitutes therewith an oscillation generator for developing and applying the required demodulation signal to the deflector electrodes.

A coupling capacitor 50 provides means for concurrently applying the output signal of ratio detector 14, including the pilot signal component, to the beam-deflection demodulator for detection therein. The other circuit connections associated with the beam-deflection tube include a grid return resistor 51 connected between grid 26 and a plane of reference potential shown as ground. Screen electrode 27 is energized from a potential source +B through a voltage divider comprised of resistors 52 and 53, the latter being bypassed by a capacitor 54. The cathode 25 is returned to ground through a resistor 55 and a potentiometer 56 connects the cathode to load resistor 33 of anode 24 while a similar potentiometer 57 connects the cathode to load resistor 30 of anode 23. The interconnection of the cathode load with the anode loads accomplishes matrixing as explained in the above-identified De Vries application in order to permit obtaining separated A audio at the tap of potentiometer 56 and separated B audio at the tap of potentiometer 57. Capacitors 58 and 59 associated with the adjustable taps of these potentiometers provide the de-emphasis characteristically employed in a frequency modulation receiver. The tap of each potentiometer connects to an assigned one of amplifiers 16 and 17.

As indicated above, it is necessary that the locally generated demodulation signal correspond in frequency to the fundamental of the suppressed-carrier subcarrier wave and be accurately controlled in phase with respect to the pilot signal. To accomplish this result, arrangement 15 further includes a phase detector for deriving from at least one of the load networks, coupled to the beam-deflection anodes, an amplitude-modulated signal presently to be more fully described and for rectifying that signal to develop a control potential representing the sense and extent of deviation of the phase relation of the locally generated demodulation signal and the pilot signal from a desired reference phase condition. While the phase detector may be of the unbalanced type, it is more appropriate to utilize a balanced system which provides immunity against amplitude variations of the received pilot signal. That is why a pair of tuned circuits 31, 32 and 35, 36 are included in the load networks of anodes 23, 24. Each such tuned circuit is resonant at the beat between the locally generated demodulation signal and the pilot signal but since the pilot is half the frequency of the fundamental component of the suppressed-carrier wave, the beat frequency corresponds in value to the pilot frequency. The phase detector system also includes a pair of rectifiers 65, 66. Rectifier 65 is inductively coupled to tuned circuit 31, 32 through an inductor 67 and has a load circuit comprised of a resistor 68 and a parallel connected capacitor 69. The negative potential terminal of load 68, 69 is connected to ground. The circuit of rectifier 66 is essentially the same, including an inductor 70 inductively coupled to resonant circuit 35, 36 and a load circuit provided by the parallel combination of a resistor 71 and a capacitor 72. Rectifiers 65 and 66 are oppositely poled and therefore a connection from corresponding terminals of their separate loads couples the rectifiers in phase opposition to the end that the control potential obtained from the system is the differential of the voltages developed in the load circuits of the two rectifiers.

This control potential is utilized by means for effecting phase changes of the locally generated demodulation signal to maintain the desired reference phase condition of this signal with the pilot. Any known, voltage-sensitive frequency control device such as a reactance tube, voltage sensitive capacitor or the like may be employed but as shown, this means is a well known form of reactance tube comprising a pentode 80 having an anode coupled through an inductor 81 and a resistor 82 to a source of potential +B. The junction of inductor 81 and resistor 82 is coupled to ground through a resistor 86 and a shunt capacitor 87. The screen electrode of tube 80 is energized from a source +B through a voltage dividing network of resistors 83 and 84, the latter being bypassed by a capacitor 85. Inductor 81 is coupled to inductor 41 to inject a quadrature phase component of variable amplitude into the oscillator tank circuit 40, 41. At the same time, oscillator voltage is injected into the input circuit of tube 80 by an inductor 88 which is likewise coupled to oscillator inductor 41. One terminal of inductor 88 is directly grounded and the other is connected through a capacitor 89 and a series resistor 90 to ground. The junction of capacitor 89 and resistor 90 connects through a capacitor 91 to the control grid of tube 80. Elements 89–91, inclusive, in conjunction with a grid resistor 92 constitute the phase shift network for achieving the quadrature phase relation of signal energy fed from the oscillator to the input circuit of the reactance tube. The effective reactance that tube 80 introduces into the oscillating section of the beam-deflection tube is determined by the control potential applied to the gird of the reactance tube from rectifiers 65, 66 through series resistor 92.

In the operation of arrangement 15, the signal output of ratio detector 14 representing the modulation function of expression (1) is applieid to the first control electrode 26 of the beam-deflection tube. Concurrently, a demolution signal is developed through the oscillatory system associated with the deflectors of tube 20 and therefore is present on those deflectors in push-pull relation. The simultaneous application of these signals to the beam-deflection tube accomplishes demodulation as a result of which the A audio signal is developed predominantly in load resistor 33 and the B audio signal is developed predominantly in load resistor 30. Matrixing of the composite modulation signal available across cathode resistor 55 with the demodulated signals developed at output load resistors 30 and 33 permits separated A audio to be obtained from potentimeter 56 for application to amplifier 16 and separated B audio from potentiometer 57 for application to amplifier 17. A more detailed discussion of this matrixing is present in the afore-identified De Vries application.

Concurrently with the signal demodulation, the pilot signal beats with the locally generated demodulation signal to develop a beat signal having the same frequency as, but subject to varying phase relation with, the pilot signal. The combination is a signal having amplitude variations which are selected by tuned circuits 31, 32, and 35, 36 and rectified by rectifiers 65, 66. The differential of the rectified voltages is a manifestation of the phase relation of the pilot and the locally generated demodulation signal. When these signals are properly phased, the rectifiers develop equal and opposite voltages but for any other phase condition a net control potential is developed since the voltage of one rectifier exceeds that of the other. The polarity of the net potential indicates the sense of the phase deviation and its magnitude represents the extent of deviation. Reactance tube 80, in response to the control potential, introduces a varying component of reactance to the oscillatory system to maintain the pilot and locally generated demodulation signal in precise phase.

It may be shown mathematically that the described phase control system exhibits the usual discriminator characteristic, having zero value for proper phase relation and a polarity indicative of the sense of the phase deviation for any other phase condition. Let it be assumed that the locally generated switching signal may be represented as follows:

$$K_4\cos(\omega_{sc}+\varphi_{sc}) \qquad (2)$$

where $K_4$ is a constant, $\omega_{sc}$ is the angular frequency of the demodulation signal and $\varphi_{sc}$ is its phase angle. If the transition of the beam from one anode to the other is very sharp, that is to say occurs essentially momentarily, the deflection of the beam by signal of expression (2) is analogous to the utilization of a deflection signal of square waveform. The effective square wave form derivable at the anodes is in accordance with the following expressions:

$$\text{Anode 23: } \frac{1}{2}+\frac{2}{\pi}\cos(\omega_{sc}+\varphi_{sc})- \qquad (3)$$

$$\text{Anode 24: } \frac{1}{2}-\frac{2}{\pi}\cos(\omega_{sc}+\varphi_{sc})+ \qquad (4)$$

Expressions (3) and (4) have a multiplicity of terms but only the first two are of any interest and therefore the higher order terms have not been identified.

The composite signal delivered to grid 26 from ratio detector 14 includes, among other components, one representative of the pilot signal which may be written as:

$$K_5\cos\frac{\omega_{sc}}{2} \qquad (5)$$

where $K_5$ is a constant.

The voltage contribution at the anodes of the beam-deflection tube, attributable to the pilot signal, may be expressed as follows:

$$\text{Voltage at Anode 23: } K_6\left[\frac{1}{2}\cos\frac{\omega_{sc}}{2}+\frac{1}{\pi}\cos\left(\frac{\omega_{sc}}{2}+\varphi_{sc}\right)\right] \qquad (6)$$

$$\text{Voltage at Anode 24: } K_6\left[\frac{1}{2}\cos\frac{\omega_{sc}}{2}-\frac{1}{\pi}\cos\left(\frac{\omega_{sc}}{2}+\varphi_{sc}\right)\right] \qquad (7)$$

where $K_6$ is a constant.

These expressions may be developed and simplified into the following approximation:

$$\text{Voltage at Anode 23: } K_7\sqrt{0.35+0.32\cos\varphi_{sc}}\cdot\cos\left(\frac{\omega_{sc}}{2}+\varphi\right) \qquad (8)$$

$$\text{Voltage at Anode 24: } K_7\sqrt{0.35-0.32\cos\varphi_{sc}}\cdot\cos\left(\frac{\omega_{sc}}{2}+\varphi\right) \qquad (9)$$

where $K_7$ is a constant.

Expressions (8) and (9) define a pair of signal components each of which has amplitude variations as a function of phase change of the pilot and locally generated demodulation signals.

FIGURE 2 includes as curve C a plot of expression (8) and as curve D a plot of expression (9). These are the signals delivered to rectifiers 65, 66. Since the rectified voltages are differentially combined, the net control voltage developed in the phase detector is represented by curve E. It will be recognized as a familiar discriminator characteristic. Its crossing with the zero axis occurs in the presence of the proper phase condition and other phase relations are manifest in the polarity and magnitude of the net control potential obtained from rectifiers 65, 66. Because the phase detector exhibits this discriminator characteristic, its output voltage as applied to reactance tube 80 causes the oscillatory section of the demodulator to be controlled as required to maintain the reference phase relation necessary for faithful synchronous demodulation of the signal applied to grid 26 and represented by the composite modulation function of expression (1).

When the desired phase relations have been established, the second harmonic of the received pilot signal is in phase quadrature with the locally generated demodulation signal. As transmitted, however, the pilot is in phase with the suppressed-carrier component of the subcarrier signal and the 90 degree phase shift occurs within the receiver. Some phase shift of the pilot is inherent or unavoidable in its translation through the receiver and its adjustment to 90 degrees may be accomplished by adding a phase shift network, by adjustment of the bias of the reactance tube or through both expedients.

In order more completely to describe an embodiment of an invention, there is listed herein the parameters of one arrangement that has been operated satisfactorily. It is of course understood that the specification of parameters is purely by way of illustration and not limitation.

| | | |
|---|---|---|
| Resistors 30, 33 | ohms | 47,000 |
| Resistors 51, 110, 111 | do | 100,000 |
| Resistors 52, 86 | do | 22,000 |
| Resistor 53 | do | 82,000 |
| Resistor 55 | do | 1,200 |
| Resistors 68, 71 | do | 470,000 |
| Resistors 82, 83, 90, 92 | do | 10,000 |
| Resistor 84 | do | 15,000 |
| Voltage divider 56, 57 | megohm | 1 |
| Capacitors 31, 35, 40, 69, 72 | micromicrofarads | 1,500 |
| Capacitors 42, 43 | do | 150 |
| Capacitor 50 | microfarad | 0.1 |
| Capacitors 54, 85 | do | 0.1 |
| Capacitors 58, 59 | micromicrofarads | 270 |
| Capacitor 87 | microfarad | 0.1 |
| Capacitors 89, 91 | micromicrofarads | 390 |
| Tube 20 | | Type 6AR8 |
| Tube 80 | | Type 6AU6 |
| B supply voltage | volts | 250 |
| Pilot signal frequency | kilocycles | 19 |
| Subcarrier fundamental | do | 38 |

It is extremely useful to arrange that the stereophonic frequency modulation receiver be a two-mode device, capable of monophonic as well as stereophonic reproduction and adjustable as between these modes in accordance with the character of the received signal without imposing any obligation of manipulation on the part of the user. A receiver having this property is the subject of an application of Adrian J. De Vries, Serial No. 118,009 filed June 19, 1961 and assigned to the same assignee as the present invention. The receiver of FIGURE 1 may be modified to exhibit this property in the manner indicated in FIGURE 3.

It is apparent that a signal of positive polarity is available in the load circuit of rectifier 65 during the presence of the pilot signal and this is utilized as a control voltage in the arrangement of FIGURE 3 to perform a desired control function. In particular, it is utilized to energize the oscillatory portion of the demodulator only during the presence of the pilot signal.

For this purpose, a low-pass filter comprising a series inductor 100 and shunt capacitors 101 and 102 is connected through an isolating resistor 103 to the high potential terminal of load network 68, 69. The filter is terminated by a shunt resistor 104 and the output, designated by the arrowhead X, connects at the circuit point X at grid resistor 51 to control electrode 26 of beam-deflection tube 20. This connection constitutes means, coupled to the phase detector, for energizing the oscillatory section of the demodulator only in the presence of the pilot signal by adjusting an operating potential, specifically the grid potential, of the electrode system as required to sustain oscillation. The operating potentials of the beam-deflection tube of FIGURE 3, in the absence of a pilot signal, result in insufficient gain to sustain oscillations. When a pilot signal is received, however, it is translated through the tube and is rectified in the rectifier circuits with the result that an increment of positive potential is applied through filter 100–102 to grid 26. This increases the gain by modifying the operating point of the beam-deflection tube so that oscillations may be sustained. Accordingly, a demodulation signal corresponding to the fundamental of the suppressed-carrier-modulated subcarrier wave is generated and demodulation takes place so long as the pilot signal is received.

If the synchronous detector and phase control system of FIGURE 3 are substituted for the corresponding portion of the receiver of FIGURE 1, the receiver is of the multi-mode type and adjusts itself between its two possible operating modes in accordance with the character of the received signal. If the received broadcast represents a stereophonic program, the pilot signal is present and the arrangement operates as previously described to effect stereophonic reproduction of the program. On the other hand, during intervals in which the received signal is the usual monaural program, no pilot component is present. In this instance, the oscillatory section of the beam-deflection tube is, in effect, disabled and the beam developed in the tube assumes a static position where it is balanced with respect to the output anodes and impinges upon both. For this operating condition, the beam-deflection tube functions simply as an audio amplifier which may have unity gain or less than unity gain. However, it is effective to translate the audio information which is the only information developed in ratio detector 14 under the assumed conditions. Audio signals of the same composition are then developed in the loads of anodes 23, 24 and are supplied through amplifiers 16, 17 to speakers 18, 19 for monaural reproduction. Of course, control of the static beam position may be readily obtained by the introduction of a bias potential on either or both deflectors and adjustable in magnitude.

It has been stated that similar results may be obtained through a variety of detector mechanisms and the one represented in FIGURE 4 makes use of a multi-grid tube which may be of the 6BE6 or 6BN6 type. This modification also shows the use of an oscillation generator which is separate from the detector tube. A multi-grid tube 120 has a signal grid 121 to which the signal from the ratio detector may be applied through coupling capacitor 50. This grid is returned to ground through a grid resistor 122. The cathode is grounded through a self-biasing network of a resistor 123 and capacitor 124.

Next beyond first grid 121 is a first screen electrode 125 which is conductively connected to the fourth grid 127. Between these two is a second signal grid 128 to which the locally generated demodulation signal, developed in an oscillator and reactance tube 130, is applied through a coupling capacitor 131. The suppressor electrode 129 is coupled to the cathode and the anode 132 connects to a source of operating potential +B through a load resistor 133 and a resonant circuit 31, 32 which is tuned to the beat frequency as in the arrangement of FIGURE 1. The screen electrodes are likewise connected to a source of operating potential through a load resistor 134 and a tuned circuit including capacitor 35 and inductor 36 tuned to the same beat frequency. The stereophonic information is obtained from the plate load 133 and screen load 134 and may be applied to audio systems corresponding to elements 16–19 of FIGURE 1 through matrixing and de-emphasizing networks to accomplish separation and de-emphasis in essentially the same fashion as in FIGURE 1.

In this arrangement, the screen electrode 125 is used as an output electrode and the demodulation signal on grid 128, in effect, shifts the plate current between output electrode 132 on one hand and output electrode 125 on the other. This function is analogous to that of the beam-deflection tube and accomplishes synchronous detection. However, the load impedances connected to anode 132 and to screen electrode 125 are to be proportioned relative to one another, in view of the transconductances to these electrodes, to achieve proper relative amplitudes of the separated signals. The automatic phase control of this arrangement is in all material respects the same as that of FIGURE 1. A control potential developed in the rectifier circuits is applied to the reactance tube included in unit 130.

Of course, multi-mode operation is also obtainable with an arrangement generally similar to that of FIGURE 4, if the oscillator of unit 130 has operating potentials such that in the absence of a positive direct-current potential applied from the rectifiers of the phase detector system self-sustaining oscillations are not possible. A coupling network for applying a control potential to the oscillator from a rectifier of the phase detector is indicated by the block 140 and comprises a low-pass filter similar to that shown in FIGURE 3.

All of the illustrated embodiments of the invention make use of a balanced phase detector but, as indicated above, an unbalanced detector may of course be employed. The unbalanced phase detector utilizes but a single tuned circuit in the load network of one of the output electrodes of the synchronous demodulator and a single rectifier associated with that resonant circuit. In this case, phase changes are reflected in changes of the rectified voltage with respect to a reference other than zero. An increase in rectified voltage signifies a phase change in one sense and a decrease in rectified voltage signifies a phase change in the opposite sense. The change in potential may control the reactance tube and its contribution to the oscillating system with which it is associated to maintain the desired phase relation of the demodulation signal to the received pilot.

The various modifications illustrated and described depict simplified synchronous demodulators that are particularly attractive for stereophonic receivers whether those receivers may likewise utilize monophonic program transmissions or not. They adapt themselves to self-adjusting multi-mode operation and accomplish the necessary functions of a stereophonic receiver with a significant reduction in circuit components.

While particular embodiments of the invention have been shown and described it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A synchronous demodulator for detecting a suppressed-carrier amplitude-modulated carrier wave accompanied by a pilot signal of fixed phase but 1/*N* times the frequency of the fundamental component of said carrier wave, where N is an integer less than three, said demodulator comprising: means, including a pair of detectors having individual load networks, for demodulating said carrier wave; means for developing and applying to said demodulating means a demodulation signal corresponding in frequency to the frequency of said carrier wave; means for concurrently applying said carrier wave and said pilot signal to said demodulating means to develop therein a signal component having amplitude variations representing the relative phase of said pilot and said demodulation signals; a phase detector for deriving from at least one of said load networks and for rectifying said signal component to develop a control potential representing the sense and extent of deviation of the phase relation of said demodulation and said pilot signals from a reference phase condition; and means for utilizing said control potential to effect phase changes of said demodulation signal to maintain said reference phase condition.

2. A synchronous demodulator for detecting a suppressed-carrier amplitude-modulated carrier wave accompanied by a pilot signal of fixed phase but 1/*N* times the frequency of the fundamental component of said carrier wave, where N is an integer less than three, said demodulator comprising: beam-deflection means, effectively including a pair of detector circuits having individual load networks, for demodulating said carrier wave; means for developing and applying to said demodulating means a demodulation signal corresponding in frequency to the frequency of said carrier wave; means for concurrently applying said carrier wave and said pilot signal to said demodulating means to develop therein a signal component having amplitude variations representing the relative phase of said pilot and said demodulation signals; a phase detector for deriving from at least one of said load networks and for rectifying said signal component to develop a control potential representing the sense and extent of deviation of the phase relation of said demodulation and said pilot signals from a reference phase condition; and means for utilizing said control potential to effect phase changes of said demodulation signal to maintain said reference phase condition.

3. A synchronous demodulator for detecting a suppressed-carrier amplitude-modulated carrier wave accompanied by a pilot signal of fixed phase but 1/*N* times the frequency of the fundamental component of said carrier wave, where N is an integer less than three, said demodulator comprising: means, including a pair of detectors having individual load networks, for demodulating said carrier wave; means, included within said demodulating means, for developing a demodulation signal corresponding in frequency to the frequency of said carrier wave; means for concurrently applying said carrier wave and said pilot signal to said demodulating means to develop therein a signal component having amplitude variations representing the relative phase of said pilot and said demodulation signals; a phase detector for deriving from at least one of said load networks and for rectifying said signal component to develop a control potential representing the sense and extent of deviation of the phase relation of said demodulation and said pilot signals from a reference phase condition; and means for utilizing said control potential to effect phase changes of said demodulation signal to maintain said reference phase condition.

4. A synchronous demodulator for detecting a suppressed-carrier amplitude-modulated carrier wave accompanied by a pilot signal of fixed phase but 1/*N* times the frequency of the fundamental component of said carrier wave, where N is an integer less than three, said demodulator comprising: a beam-deflection tube having an electrode system including a pair of deflector electrodes, and a pair of output electrodes and further having individual load networks for said output electrodes, for demodulating said carrier wave; means, coupled to said electrode system and constituting therewith an oscillation generation, for developing and for applying to said deflector electrodes a demodulation signal corresponding in frequency to the frequency of said carrier wave; means for concurrently applying said carrier wave and said pilot signal to said demodulating means to develop therein a signal component having amplitude variations representing the relative phase of said pilot and said demodulation signals; a phase detector for deriving from at least one of said load networks and for rectifying said signal component to develop a control potential representing the sense and extent of deviation of the phase relation of said demodulation and said pilot signals from a reference phase condition; and means for utilizing said control potential to effect phase changes of said demodulation signal to maintain said reference phase condition.

5. A synchronous demodulator for detecting a suppressed-carrier amplitiude-modulator carrier wave accompanied by a pilot signal of fixed phase but 1/*N* times the frequency of the fundamental component of said carrier wave, where N is an integer less than three, said demodulator comprising: a beam-deflection tube having an electrode system including a pair of deflector electrodes, and a pair of output electrodes and further having individual load networks for said output electrodes, for demodulating said carrier wave; means, coupled to said deflector electrodes of said electrode system and constituting therewith an oscillation generation, for developing and for applying to said deflector electrodes a demodulation signal corresponding in frequency to the frequency of said carrier wave; means for concurrently applying said carrier wave and said pilot signal to said demodulating means to develop therein a signal component having amplitude variations representing the relative phase of said pilot and said demodulation signals; a phase detector for deriving from at least one of said load networks and for rectifying said signal component to develop a control potential representing the sense and extent of deviation of the phase relation of said demodulation and said pilot signals from a reference phase condition; and means for utilizing said control potential to effect phase changes of said demodulation signal to maintain said reference phase condition.

6. A synchronous demodulator for detecting a suppressed-carrier amplitude-modulated carrier wave accompanied by a pilot signal of fixed phase but 1/*N* times the frequency of the fundamental component of said carrier wave, where N is an integer less than three, said demodulator comprising: a beam-deflection tube, having an electrode system including a pair of deflector electrodes, and a pair of output electrodes and further having individual load networks for said output electrodes, for demodulating said carrier wave; means, coupled to said electrode system and constituting therewith an oscillation generation, for developing and for applying to said deflector electrodes a demodulation signal corresponding in frequency to the frequency of said carrier wave; means for concurrently applying said carrier wave and said pilot signal to said demodulating means to develop therein a signal component having amplitude variations representing the relative phase of said pilot and said demodulation signals; a phase detector, comprising a pair of tuned circuits resonant at the frequency of said beat signal for deriving said signal component from said respective load networks, a pair of rectifiers for rectifying said beat signal, and means for coupling said rectifiers in phase opposition to develop a control potential representing the sense and extent of deviation of the phase relation of said demodulation and said pilot signals from a reference phase condition; and means for utilizing said control potential to effect phase changes of said demodulation signal to maintain said reference phase condition.

7. A synchronous demodulator for detecting a suppressed-carrier amplitude-modulated carrier wave accompanied by a pilot signal of fixed phase but half the frequency of the fundamental component of said carrier wave comprising: means, including a pair of detectors having individual load networks, for demodulating said carrier wave, each of said networks including a tuned circuit resonant to the frequency of said pilot signal; means for developing and applying to said demodulator means a demodulation signal corresponding in frequency to the frequency of said carrier wave; means for concurrently applying said carrier wave and said pilot signal to said demodulator means to develop in said tuned circuits a signal component having amplitude variations representing the relative phase of said demodulation and pilot signals; a phase detector coupled to said tuned circuits for utilizing said signal component to develop a control potential representing the sense and extent of deviation of the phase relation of said demodulation and said pilot signals from a reference phase condition; and means for utilizing said control potential to effect phase changes of said demodulation signal to maintain said reference phase condition.

8. A synchronous demodulator for detecting a suppressed-carrier amplitude-modulated carrier wave accompanied by a pilot signal of fixed phase but 1/*N* times the frequency of the fundamental component of said carrier wave, where N is an interger less than three, said demodulator comprising: means, including a pair of detectors having individual load networks, for demodulating said carrier wave; means for developing and applying to said demodulating means a demodulation signal corresponding in frequency to the frequency of said carrier wave; means for concurrently applying said carrier wave and said pilot signal to said demodulating means to develop therein a signal component having amplitude variations representing the relative phase of said pilot and said demodulation signals; a phase detector for deriving from at least one of said load networks and for rectifying said signal component to develop a control potential representing the sense and extent of deviation of the phase relation of said demodulation and said pilot signals from a reference phase condition; means for utilizing said control potential to effect phase changes of said demodulation signal to maintain said reference phase condition; and means coupled to said phase detector for energizing said demodulation-signal-developing means only during the presence of said pilot signal.

9. A synchronous demodulator for detecting a suppressed-carrier amplitude-modulated carrier wave accompanied by a pilot signal of fixed phase but 1/*N* times the frequency of the fundamental component of said carrier wave, where N is an integer less than three, said demodulator comprising: a beam-deflection tube having an electrode system including a pair of deflector electrodes and a pair of output electrodes and further having individual load networks for said output electrodes, for demodulating said carrier wave; means for developing and applying to said demodulating means a demodulation signal corresponding in frequency to the frequency of said carrier wave; means for concurrently applying said carrier wave and said pilot signal to said demodulating means to develop therein a signal component having amplitude variations representing the relative phase of said pilot and said demodulation signals; a phase detector for deriving from at least one of said load networks and for rectifying said signal component to develop a control potential representing the sense and extent of deviation of the phase relation of said demodulation and said pilot signals from a reference phase condition; means for utilizing said control potential to effect phase changes of said demodulation signal to maintain said reference phase condition; and means coupled to said phase detector for adjusting an operating potential of said electrode system as required to sustain oscillations only during the presence of said pilot signal.

10. A synchronous demodulator for detecting a suppressed-carrier amplitude-modulated carrier wave accompanied by a pilot signal of fixed phase but 1/*N* times the frequency of the fundamental component of said carrier wave, where N is an integer less than three, said demodulator comprising: multi-mode means, including a pair of detectors having individual load networks, for functioning in one mode as a signal amplifier and for functioning in another mode as a demodulator for said carrier wave; means for developing and applying to said multi-mode means a demodulation signal corresponding in frequency to the frequency of said carrier wave; means for concurrently applying said carrier wave and said pilot signal to said multi-mode means to develop therein a signal component having amplitude variations representing the relative phase of said pilot and said demodulation signals; a phase detector for deriving from at least one of said load networks and for rectifying said signal component to develop a control potential representing the sense and extent of deviation of the phase relation of said demodulation and said pilot signals from a reference phase condition; means for utilizing said control potential to effect phase changes of said demodulation signal to maintain said reference phase condition; and means coupled to said phase detector for selectively establishing said multi-mode means in one of its two operating modes.

11. A synchronous demodulator for detecting a suppressed-carrier amplitude-modulated carrier wave accompanied by a pilot signal of fixed phase but 1/*N* times the frequency of the fundamental component of said carrier wave, where N is an integer less than three, said demodulator comprising: multi-mode means, including a pair of detectors having individual load networks, for functioning in one mode as a signal amplifier and for functioning in another mode as a demodulator for said carrier wave; means for developing and applying to said multi-mode means a demodulation signal corresponding in frequency to the frequency of said carrier wave; means for concurrently applying said carrier wave and said pilot signal to said multi-mode means to develop therein a signal component having amplitude variations representing the relative phase of said pilot and said demodulation signals; a phase detector for deriving from at least one of said load networks and for rectifying said signal component to develop a control potential representing the sense and extent of deviation of the phase relation of said demodulation and said pilot signals from a reference phase condition; means for utilizing said control potential to effect phase changes of said demodulation signal to maintain said reference phase condition; and means coupled to said phase detector and responsive to the reception of said pilot signal for selectively establishing said multi-mode means in its aforesaid demodulating mode.

12. A synchronous demodulator for detecting a suppressed-carrier amplitude-modulated carrier wave accompanied by a pilot signal of fixed phase but 1/*N* times the frequency of the fundamental component of said carrier wave, where N is an integer less than three, said demodulator comprising: means, including a pair of detectors having individual load networks, for demodulating said carrier wave; means for developing and applying to said demodulating means a demodulation signal corresponding in frequency to the frequency of said carrier wave; means for concurrently applying said carrier wave and said pilot signal to said demodulating means to develop therein a signal component having amplitude variations representing the relative phase of said pilot and said demodulation signals; a phase detector comprising means for deriving said signal component from each of said load networks, means for rectifying the derived signal component energy, and means for obtaining a differential of the rectified signal component energy to develop a control potential representing the sense and extent of deviation of the phase relation of said demodulation and said pilot signals from a reference phase condition; and means for utilizing said control potential to effect phase changes of said demodulation signal to maintain said reference phase condition.

References Cited by the Examiner

UNITED STATES PATENTS

| | | | |
|---|---|---|---|
| 2,588,094 | 3/52 | Eaton | 329—50 |
| 2,924,706 | 2/60 | Sassler | 329—50 |
| 2,987,617 | 6/61 | Loughlin | 329—50 |
| 3,009,111 | 11/61 | Rhodes | 329—50 |

ROY LAKE, *Primary Examiner.*

ROBERT H. ROSE, *Examiner.*